(12) United States Patent
Lopez Moreira et al.

(10) Patent No.: US 11,489,960 B2
(45) Date of Patent: Nov. 1, 2022

(54) METHOD OF DETERMINING THE QUALITY OF VOICE DATA WITH TRANSMISSION VIA A NETWORK, METHOD OF AND AN APPARATUS FOR PERFORMING A TELEPHONE CALL

(71) Applicant: Unify Patente GmbH & Co. KG, Munich (DE)

(72) Inventors: Alexandre Lopez Moreira, Curitiba (BR); Rubens Da Silva, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 234 days.

(21) Appl. No.: 16/759,023

(22) PCT Filed: Oct. 25, 2018

(86) PCT No.: PCT/EP2018/079305
§ 371 (c)(1),
(2) Date: Apr. 24, 2020

(87) PCT Pub. No.: WO2019/081649
PCT Pub. Date: May 2, 2019

(65) Prior Publication Data
US 2021/0185168 A1   Jun. 17, 2021

(30) Foreign Application Priority Data

Oct. 27, 2017 (EP) .................................. 17198963

(51) Int. Cl.
*H04M 3/22* (2006.01)
*H04L 1/20* (2006.01)
*H04L 1/24* (2006.01)

(52) U.S. Cl.
CPC ............ *H04M 3/2236* (2013.01); *H04L 1/20* (2013.01); *H04L 1/242* (2013.01)

(58) Field of Classification Search
None
See application file for complete search history.

(56) References Cited

U.S. PATENT DOCUMENTS 6,775,240 B1 *  8/2004  Zhang ................. H04M 3/2227
                                                   370/251
7,664,231 B2 *  2/2010  Schmidmer ......... H04M 3/2236
                                                   379/1.01
(Continued)

FOREIGN PATENT DOCUMENTS

WO              01/93470 A1     12/2001
WO         20170173777 A1      10/2017
WO       WO-2017173777 A1 *   10/2017 ............. H04M 3/22

OTHER PUBLICATIONS

International Search Report for PCT/EP2018/079305 dated Jan. 4, 2019.

(Continued)

*Primary Examiner* — Quoc D Tran
(74) *Attorney, Agent, or Firm* — Buchanan Ingersoll & Rooney PC

(57) ABSTRACT

A method of determining the quality of transmitted voice data can include:
providing voice data at a transmitter side in a first data format,
providing a first test signal in the first data format,
combining the voice data and the test signal to form input data,
transmitting the input data in a transmittal data format,
receiving the transmitted input data at a receiver side to obtain output data,
removing at least portions of a data packet in the output data or of a data packet derived therefrom in order to derive a second test signal, and
analysing the derived second test signal by applying a predetermined analysis criterion in order to obtain at
(Continued)

least one value for a quality indicator. An apparatus and system can also be configured to utilize embodiments of the method.

18 Claims, 2 Drawing Sheets

(56) References Cited

U.S. PATENT DOCUMENTS

| | | | | |
|---|---|---|---|---|
| 8,054,946 B1* | 11/2011 | Kronrod | ............. | H04L 43/0858 379/22 |
| 8,737,571 B1* | 5/2014 | Seeley | .................... | H04M 3/28 379/24 |
| 2002/0114296 A1* | 8/2002 | Hardy | ................... | H04M 7/006 370/254 |
| 2003/0092394 A1* | 5/2003 | Gray | ................... | H04B 17/309 455/67.14 |
| 2006/0093094 A1* | 5/2006 | Xing | ................... | H04M 3/2236 379/1.02 |
| 2008/0043931 A1* | 2/2008 | Steele | ................... | H04M 9/082 379/27.03 |
| 2016/0365934 A1* | 12/2016 | Maeda | ................. | H04B 17/309 |

OTHER PUBLICATIONS

Written Opinion of the International Searching Authority for PCT/EP2018/079305 dated Jan. 4, 2019.

* cited by examiner

METHOD OF DETERMINING THE QUALITY OF VOICE DATA WITH TRANSMISSION VIA A NETWORK, METHOD OF AND AN APPARATUS FOR PERFORMING A TELEPHONE CALL

CROSS-REFERENCE TO RELATED APPLICATIONS

The present application is the U.S. national stage application of International Patent Application No. PCT/EP2018/079305, filed on Oct. 25, 2018 and claiming priority to European Patent Application No. 17198963.5, filed on Oct. 27, 2017.

FIELD

The invention relates to a method of determining the quality of transmitted voice data, in particular of speech data transmitted during a telephone call, and further relates to a method of and an apparatus for performing a telephone call.

BACKGROUND

US 2009/238085 A1 discloses a digital signal processor at a receiver side that extracts quality factors for each of packet delay, jitter, packet loss and signal energy information in order to determine a dynamic voice quality value for the endpoint, with the purpose to obtain on the basis of these quality factors, from a lookup table, the dynamic voice quality at the endpoint. The resources of processing time for respective calculations are high, if a good assessment of quality is to be achieved.

US 2017/104867 A1 discloses to analyse at an endpoint terminal transmission information and/or acoustic quality information but remains silent as to details of such analysis.

US 2003/009306 A1 relates to voice-aided diagnostic for a voice over internet protocol based device, wherein self diagnostic tasks are invoked through voice commands. Hence, the voice quality is not permanently controlled.

U.S. Pat. No. 7,830,860 B2 deals with packet data network voice call monitoring, wherein regularly, ping request packets are transmitted, namely during silent intervals. The disadvantage thereof lies in that just when a good voice quality is not needed, during silence, the analysis is made.

The company Selvana Oü, Roosikrantsi to 2, Tallinna linn,

Harjumaakond, 10119 Estonia, offers a product called AQuA wherein audio reference signals are inserted into the transmitted data, for quality control.

U.S. Pat. No. 8,593,975 A as well describes to insert reference test packets into transmitted actual streaming packets in a packet-based network, these reference test packets for enabling voice quality analysis. The document mentions that measures need to be taken for the listener not to be disturbed by the insertion of the reference test packets.

SUMMARY

It is the object of the present invention to provide for a method of determining the quality of voice data with transmission via a network, wherein the information is more steadily available, and without to extensively affecting itself the voice data audible to the listener. The object further includes providing a method of performing a telephone call with quality determination, and a respective apparatus.

In some embodiments, the object of the present invention can be solved by a method of determining the quality of transmitted voice data, a method of performing a telephone call, apparatuses (transmitter side and receiver side), and a communication system.

Embodiments of a method of determining the quality of transmitted voice data, in particular of speech data transmitted during a telephone call, wherein the voice data are transmitted via a network, can include:
- providing voice data at a transmitter side in a first data format (which might be the original analogue data format, or a digital data format derived therefrom),
- providing a first, transmitter side test signal in the (same) first data format,
- combining the voice data and the test signal to form input data (wherein such combining shall include that the data content in at least one minimum data unit of the voice data is changed on the basis of at least part of the test signal to a different data content, namely preferably in the same at least one minimum data unit, and preferably without changing the at least one minimum data unit as to its definition and size),
- transmitting the input data in a transmittal data format,
- receiving the transmitted input data at a receiver side to obtain output data,
- removing at least portions of (contents in) a data packet in the output data or of (contents in) a data packet derived therefrom in order to derive a second, receiver side test signal, i.e. representing the first test signal as transmitted and as then received at the receiver, and
- analysing the derived second test signal by applying a predetermined analysis criterion in order to obtain at least one value for a quality indicator.

By combining the voice data and the test signal to form the input data in the same, first data format, there is a real intermingling of voice data and test signal, which allows attributing a quality factor obtained from the extracted second test signal to the transmitted voice data.

In a preferred embodiment, the transmittal data format is different from the first data format. Hence, the combining takes place prior to preparing the data for transmission. That allows attributing an effect of transmission to both of the voice data and the test signal. For instance, the first data format can be an analogue data format (as upon recording of the voice data), and the transmittal data format can be a digital data format (such as for a data packet-based network).

Further preferably, therein the step of combining includes directly providing the input data in a second data format different from the first format, i.e. the combining includes performing a data transformation. That might prove advantageous in view of a quick data handling, if such transformation is needed anyhow. The second data format might directly be the transmittal data format, obtaining synergistic effects when performing the transformation upon analogue-to-digital conversation. Alternatively, the input data are first provided in the second data format and are thereafter transformed into input data in the transmittal data format. That might help avoiding artefacts to occur.

In another preferred embodiment, the step of combining includes combining the voice data and the test data in the first data format in a manner to obtain the input data in the first data format, wherein the input data in the first data format are thereafter transmitted in the first data format as the transmittal data format, or are transformed into input data in the transmittal data format. In that embodiment, from the very definition of the combining in the first data formats, it is clear that the effect the transmission has on the voice data can be most easily be assessed by the effect on the test data. In an example, the first data format allows identifying amplitudes in frequency intervals and the combining includes adding the respective amplitude in the voice data and the amplitude in the first test signal in at least one frequency interval. In other words, the contents in at least one minimum data unit are combined in a manner to be changed, i.e. these content are not preserved as such. The frequency intervals might as well be defined only for time slots in a frequency-and-time-divided scheme, and the adding can be restricted to specific time slots defined by the first test signal. Moreover, the minimum data unit could be an interval in time, wherein the first test signal is inserted in a manner to be superimposed onto the voice data, or to replace same ("beep for milliseconds"). Of course, as commonly implemented, at the receiver side, the same scheme should be used. Hence, further preferably, the output data as well allows to identify amplitudes in frequency intervals (for all times or specific time intervals), wherein the amplitudes in the first test signal are predefined and wherein identical amplitudes or corresponding amplitudes (the latter already taking into account effects of transmission such as an amplitude reduction to be reckoned with) are also stored in the receiver or a storage unit coupled to the receiver. Then, the step of removing includes subtracting the amplitudes stored in the receiver or storage unit from the output data. In that manner, the voice data can be reconstructed in an optimum manner, leading to the previous adding of the first test data being not or hardly audible. Still further preferably, the output data are provided in the first data format, that enabling to reduce artefacts in the extracted voice data. In addition or alternatively, preferably, the step of analysing includes calculating at least one Pearson coefficient (or another correlation coefficient) on the basis of individual amplitudes in the second test signal and of corresponding individual amplitudes stored in the receiver or storage unit. As is known, correlation coefficients such as the Pearson coefficient are well-suited as indicators for transmission quality.

In a further preferred embodiment of the method, the first test signal is independent of the voice data. That allows a precise extraction of these at the receiver side, namely due to predefining the second test signal corresponding to the first test signal in receivers. Alternatively, the first test signal is created in dependence of the voice data, which would enable placing the test signal either at those frequencies which are of most interest to be observed with the quality indicator. For example, in conjunction with a higher pitch voice, the first test signal might have higher pitch content than with a lower pitch voice. Alternatively, it might as well be desirable to place the first test signal in those frequency intervals which are less occupied. For instance, the first test signal is created in a manner for the input data to include, due to the first test signal, enhanced amplitude values at those frequencies where the voice data are weak according to a predetermined criterion. The predetermined criterion might includes comparing the voice data to a reference voice spectrum (either as predefined or as recorded with the same user responsible for the present voice data speaking, or as recorded with another or plural users speaking). Such reference voice spectrum would allow even more precisely defining the quality indicator. Further alternatively or further preferably, time stamps are associated to at least one of the voice data and the first test signal, and these time stamps are transmitted and received as well and used in the step of analysing. The latter feature enables a precise association of the second test data to the first test data.

Another preferred feature that can be implemented in addition or alternatively to features identified above to define preferred embodiments is that the voice data are continuously provided, and that the first test signal includes a variation over time of at least a single spectral portion therein, allowing the first test signal to be identified for being derived in the step of analysing. Hence, the test signal then does not need to be predefined as to its spectral distribution or as to individual amplitudes in frequency intervals. Rather, the receiver can most simply identify the second test signal per se, without knowing about the first test signal.

The most preferred application of the present method is in packet-based transmission, i.e. when the transmittal takes place by separately transmitting individual data packets of the input data. Here, the need for a reliable quality indicator is rather high.

Embodiments of the inventive method of performing a telephone call can include acquiring voice data at a microphone and performing the previously defined method of determining the quality of transmitted voice data, wherein those voice data provided in the step of providing are the acquired voice data (i.e. analogue data) or obtained on the basis of the acquired voice data (for instance, as converted to digital data), and wherein during the telephone call, a reaction is provided at least at the receiver side on the basis of at least one value of the quality indicator. Such reaction might include increasing the level of the volume of audio output for weak signals (usually at a low quality indicator), or decreasing same for strong signals (usually at a high quality indicator). The reaction might as well include that a signal is sent from the receiver side to another entity. A signal could be sent to the transmitter side, such as a request to increase the amplitude level at the transmitter side when the received signals are weak. Alternatively, the request could be for increasing the sample rate upon acquiring voice data to decrease the noise-to-signal level. The signal could as well simply include an acknowledgement to the transmitter side that the quality indicator was within an interval of allowed quality indicators. A signal could as well be transmitted to entities within the transmission path, for instance requesting higher gain at intermediate stations if the quality indicator is beyond an interval of allowed quality indicators or in a specific interval of quality indicators triggering such signal to be sent.

Embodiments of a first inventive apparatus for performing a telephone call includes a microphone for acquiring voice data and a transmitter coupled to the microphone, and further includes means to combine the voice data with test data to form input data, said test data being predetermined or defined in dependence of the voice data, wherein the means to combine provides the input data to the transmitter. As mentioned above, the combining shall include that the data content in at least one minimum data unit of the voice data is changed on the basis of at least part of the test signal/test data to a different data content, namely preferably in the same at least one minimum data unit, and preferably without changing the at least one minimum data unit as to its definition and size. The minimum data unit with the method and apparatuses of the invention might be or include a frequency interval per se or a frequency interval for a time slot. Alternatively, the test data might be inserted into voice data in time intervals where they are superimposed to the voice data or where the voice date are completely removed.

In a preferred embodiment, the apparatus includes a clock and means to include (or to insert) time stamps in the input data or in data obtained from the input data, such time stamps allowing to more easily recognize the test data at the receiver side.

Embodiments of a second inventive apparatus for performing a telephone call includes a receiver and a loudspeaker coupled to the receiver, wherein the apparatus further includes means for separating, from the frequency spectrum of data received by the receiver, amplitude portions pertaining to test data included in the received data, and to provide the data from which the test data have been separated to the loudspeaker, and to provide the test data to an analysis unit that analyses the test data according to a predetermined criterion to obtain a value for a quality indicator. The advantages of such apparatus are those of the above-described method in which the apparatus can be used.

Preferably, the means for separating includes a filter, that being most useful when the test data are defined with components mainly or entirely outside of a frequency band filtered out by the filer.

In another preferred embodiment of the second apparatus, the analysis unit comprises a transformation unit for providing a frequency transformation of the test data, a comparing unit for comparing at least one amplitude value in the frequency transformation to a given amplitude value, wherein further preferably, the at least one given amplitude value is stored in a storage unit of the apparatus or a storage unit coupled thereto, and wherein still further preferably, then the at least one given amplitude value is derived from other data transmitted.

The second apparatus might as well be having the properties of the first apparatus and thus being usable for transmitting and receiving, as is common with telephone conversations.

Embodiments of the inventive system for performing a telephone call includes at least one first apparatus as described above and at least one second apparatus as described above, wherein a signal indicating the at least one value for a quality indicator obtained by the second apparatus or a signal derived therefrom is transmitted from the second apparatus to the first apparatus at least if a predetermined transmitting criterion is fulfilled. Hence, a kind of feedback is given to wherefrom the voice data originate.

Then, preferably, the first apparatus reacts to the signal received from the second apparatus in a manner to change, further preferably to improve, the quality of the input data.

Other details, objects, and advantages of the telecommunications apparatus method will become apparent as the following description of certain exemplary embodiments thereof proceeds.

BRIEF DESCRIPTION OF THE DRAWINGS

Hereinafter, a preferred embodiment of the invention is described with respect to the drawing, in which:

FIG. 3a illustrates an exemplary embodiment of a test signal a test signal as a regular sequence of plural peaks. FIG. 3b illustrates an exemplary embodiment of voice data. FIG. 3c illustrates an exemplary embodiment of the superimposition of the test signal of FIG. 3a and the voice data of FIG. 3b.

DETAILED DESCRIPTION

A method of performing a telephone call between a transmitting apparatus 100 and a receiving apparatus 200 includes a method of determining the quality of the transmitted voice data. The roles of the transmitting apparatus 100 and the receiving apparatus 200 can be interchanged during the call, in dependence of at which apparatus the user is speaking. Hence, any unit described below to be part of one of the apparatuses 100, 200 can as well be part of the other apparatus 200, 100. The transmitting apparatus 100 and receiving apparatus 200 can each be configured as communication devices (e.g. terminal devices) and include a processor connected to non-transitory memory. Each apparatus can include input devices (e.g. microphone) and output devices (e.g. speaker) or input/output devices (e.g. touch screen display).

The apparatuses are presently connected via a packet-based data network 16, i.e. the data are required to be transmitted in a digital data format, which means that originally acquired analogue data would need to undergo an analogue-to-digital conversion. Else, the data could directly be acquired in the digital data format as the transmittal data format.

Figure 1:
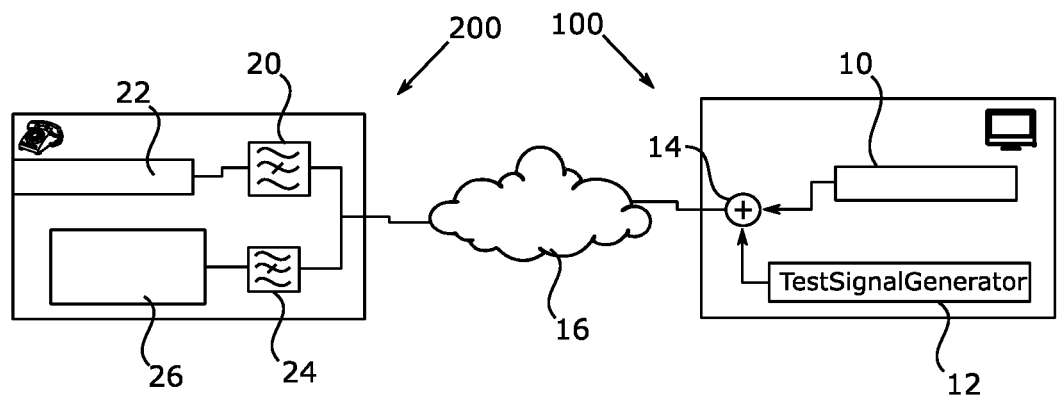
FIG. 1 shows a system for performing a telephone call wherein the inventive apparatuses are included and the inventive methods are used.

FIG. 1 shows that a voice input unit 10 (a microphone) acquires voice data. A test signal generator 12 generates a test signal which is presently independent of the voice data, i.e. includes a data scheme well-known in the overall system, for the receiving apparatus 200 to refer to such test signal. The voice data and the test signal are, according to FIG. 1, entirely added in the time domain, in adder 14.

Figure 3A:
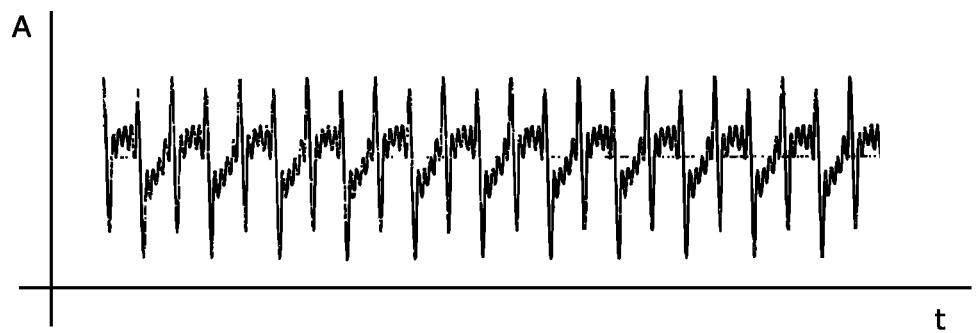
FIGS. 3a to 3c illustrate the superimposition of a test signal to voice data.
Figure 3B:
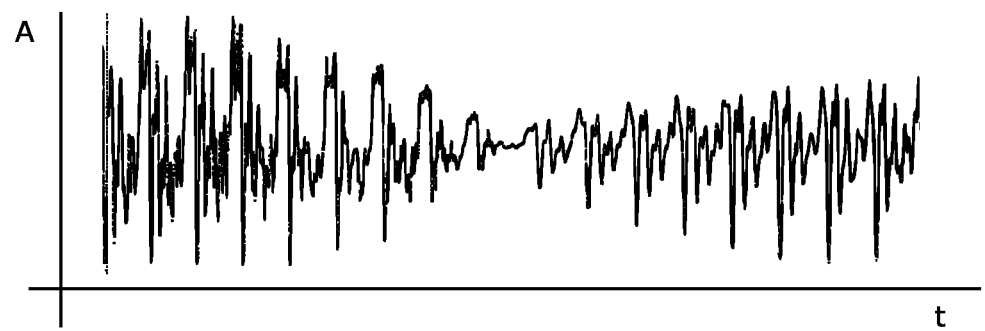
Figure 3C:
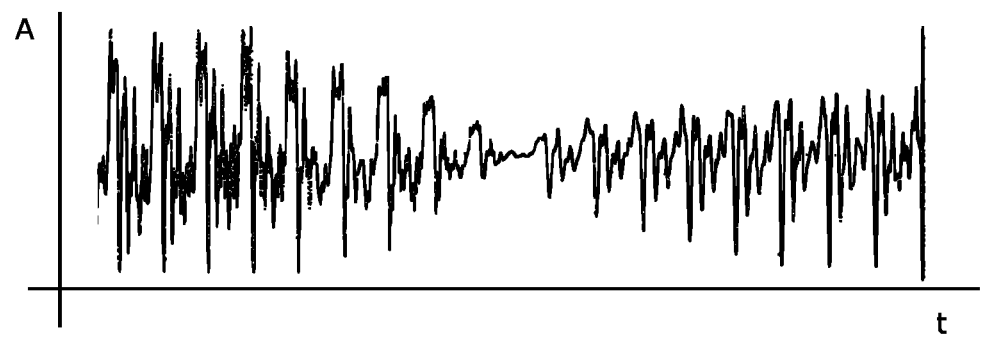

That is depicted in more detail in FIGS. 3a to 3c, which each are showing intensity A of volume (loudness), i.e. an amplitude, in arbitrary units over time t, the latter as well in arbitrary units. FIG. 3a shows an example of a test signal as a regular sequence of plural peaks. FIG. 3b shows an example of voice data. FIG. 3c shows the superimposition of the test signal of FIG. 3a and the voice data of FIG. 3b, wherein at each point in time, the intensity A of the test data has been added to the intensity A of the voice data, obtaining the resulting intensity at that point in time.

The idea of the method is based on that the quality of transmission of the voice data of FIG. 3b can be assessed in an optimum manner by referring to the test signal of FIG. 3a.

Hence, after transmission over network 16, the receiving apparatus 200 has to extract the test signal from the overall signal as received. First, a first filter 20 uses filter banks to remove the test signal form the overall signal, then supplies the resulting output data to a loudspeaker 22. Hence, the test signal is not or hardly audible. Simultaneously, a second filter 24 filters out the voice signal using filter banks, for extracting the test signal. The test signal is then analysed in analysing unit 26 that outputs a quality indicator, for use within the receiving apparatus 200 or for being sent to the transmitting apparatus 100 or to units within the network 16.

Figure 2:
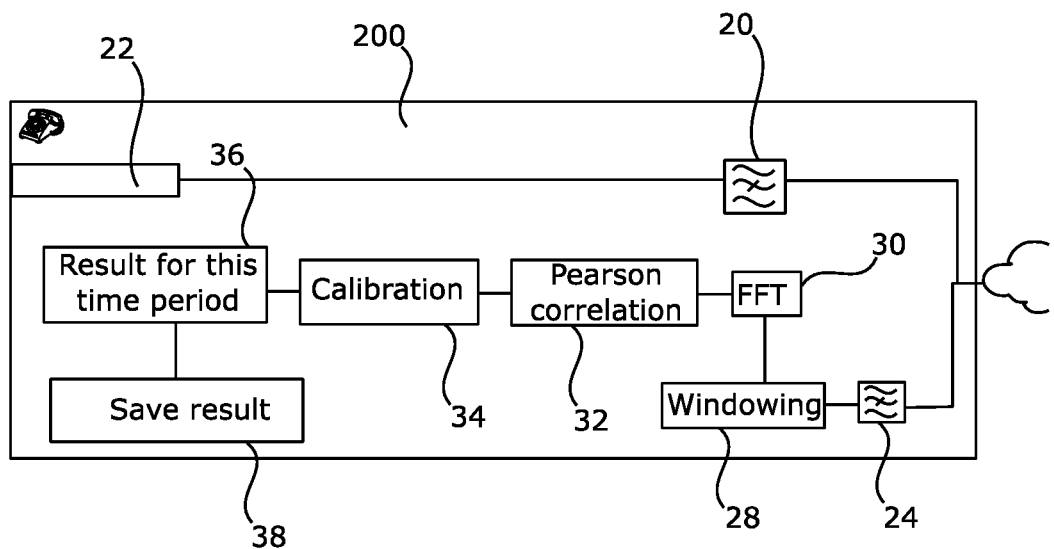
FIG. 2 shows the receiver side apparatus of FIG. 1 in more detail for illustrating an exemplary embodiment thereof.

An embodiment of the analysing unit 26 is now explained in detail with respect to FIG. 2. The analysing unit 26 includes a windowing unit 28, for being able to perform a frequency transformation, namely by limiting the overall amount of data that are used as input for the next stage, where a frequency transformation takes place. Such windowing can be performed by relying to detection of individual peaks. Alternatively, a window can be defined by relying to one or more time stamps included in the transmitted data (for which a clock would be needed within transmitting apparatus 100 as well as in or relating to the analysing unit 26). A transformation unit 30 then provides a Fast Fourier Transformation, FFT, on the basis of the limited data obtained by windowing. A correlation calculating unit 32 thereafter calculates a Pearson coefficient with respect to reference data, the latter being stored in a storage unit (not shown) of the receiving apparatus 200, or the latter having been acquired at an earlier time interval. The reference data are commonly as well provided as a Fast Fourier Transformation.

Following a calibration of the Pearson coefficient in calibration unit 34, the result defining unit 36 defines the resulting quality indicator, and that indicator is then stored in storage unit 38, for use at a later instance in the course of general quality control, or for direct use during the telephone call (requesting for causing a change in transmission quality).

Hereinbefore, the example of adding the test signal to test voice data over the entire time has been given. However, such adding can take place in only part of the overall time, i.e. in dedicated time intervals. Moreover, the adding can as well take place in the frequency domain, such as after a frequency transformation (e.g., FFT), at the transmitter side. It also can take place within time slots in the frequency domain. The adding can take place with analogue as well with digital signals. However, it should be provided for the combining of the voice data and the test signal to be of such kind that transmission effects act upon the test signal included in the transmitted data in the same or at least a similar manner than upon the voice data.

It should be appreciated that while certain exemplary embodiments of a system, a telecommunications apparatus and methods of making and using the same have been shown and described above, it is to be distinctly understood that the invention is not limited thereto but may be otherwise variously embodied and practiced within the scope of the following claims.

The invention claimed is:

1. A method of determining the quality of transmitted voice data transmitted via a network for a telephone call, said method including:
   providing voice data at a transmitter side in a first data format during the telephone call,
   providing a first test signal in the first data format,
   combining the voice data and the test signal to form input data,
   transmitting the input data in a transmittal data format during the telephone call,
   receiving the transmitted input data at a receiver side to obtain output data during the telephone call,
   removing at least portions of a data packet in the output data or of a data packet derived therefrom by the receiver side in order to derive a second test signal during the telephone call,
   analysing the derived second test signal by applying a predetermined analysis criterion in order to obtain at least one value for a quality indicator at the receiver side during the telephone call; and
   in response to the receiver side determining that the at least one value for the quality indicator is not within a pre-defined acceptable threshold during the telephone call, the receiver side performing at least one action during the telephone call to (i) adjust how the voice data is output at the receiver side based on the at least one value for the quality indicator and/or (ii) instruct the transmitter side to adjust the transmitting of the input data in the transmittal data format based on the at least one value for the quality indicator.

2. The method of claim 1, wherein the transmittal data format is different from the first data format.

3. The method of claim 2, wherein the first data format is an analogue data format and the transmittal data format is a digital data format.

4. The method of claim 3, wherein the combining includes directly providing the input data in a second data format different from the first format, wherein either the second data format is the transmittal data format, or the input data in the second data format are transformed into input data in the transmittal data format.

5. A method of determining the quality of transmitted voice data transmitted via a network, said method comprising:
   providing voice data at a transmitter side in a first data format,
   providing a first test signal in the first data format,
   combining the voice data and the test signal to form input data,
   transmitting the input data in a transmittal data format,
   receiving the transmitted input data at a receiver side to obtain output data,
   removing at least portions of a data packet in the output data or of a data packet derived therefrom in order to derive a second test signal,
   analysing the derived second test signal by applying a predetermined analysis criterion in order to obtain at least one value for a quality indicator; and
   wherein the combining includes:
   combining the voice data and the test data in the first data format in a manner to obtain the input data in the first data format, wherein the input data in the first data format are thereafter transformed into input data in the transmittal data format, wherein the first data format allows to identify amplitudes in frequency intervals and wherein the combining includes adding the respective amplitude in the voice data and the amplitude in the first test signal in at least one frequency interval,
   wherein the output data as well allows to identify amplitudes in frequency intervals, wherein the amplitudes in the first test signal are predefined and wherein corresponding or identical amplitudes are also stored in the receiver or a storage unit coupled to the receiver, and wherein the removing includes subtracting the amplitudes stored in the receiver or storage unit from the output data,
   wherein a) the output data are provided in the first data format and/or b) the analysing includes calculating at least one Pearson coefficient on the basis of individual amplitudes in the second test signal and of corresponding individual amplitudes stored in the receiver or storage unit.

6. The method of claim 5, wherein the first test signal is independent of the voice data.

7. A method of determining the quality of transmitted voice data transmitted via a network, said method comprising:
   providing voice data at a transmitter side in a first data format,
   providing a first test signal in the first data format,
   combining the voice data and the test signal to form input data,
   transmitting the input data in a transmittal data format,
   receiving the transmitted input data at a receiver side to obtain output data, removing at least portions of a data packet in the output data or of a data packet derived therefrom in order to derive a second test signal, analysing the derived second test signal by applying a predetermined analysis criterion in order to obtain at least one value for a quality indicator; and wherein the first test signal is created in dependence of the voice data and the first test signal is created in a manner for the input data to include, due to the first test signal, enhanced amplitude values at those frequencies where the voice data are weak according to a predetermined criterion; and wherein a) applying of the predetermined criterion includes the comparing the voice data to a reference voice spectrum, which is individually defined for different speakers and/or b) time stamps are associated to at least one of the voice data and the first test signal, the time stamps being transmitted and received as well and used in the analysing.

8. The method of claim 7, wherein the voice data are continuously provided, and wherein the first test signal includes a variation over time of at least a single spectral portion therein, allowing the first test signal to be identified for being derived in the analysing.

9. The method of claim 7, wherein the transmitting of the input data takes place by separately transmitting individual data packets of the input data.

10. A method of performing a telephone call, including acquiring voice data at a microphone and performing the method of determining the quality of transmitted voice data of claim 5, wherein those voice data provided in the providing of the voice data are the acquired voice data or obtained on the basis of the acquired voice data, and wherein during the telephone call, a reaction is provided at least at the receiver side on the basis of at least one value of the quality indicator.

11. An apparatus for performing a telephone call including:

a microphone for acquiring voice data; and a transmitter coupled to the microphone, wherein the apparatus configured to combine the voice data with test data to form input data, said test data being predetermined or defined in dependence of the voice data, wherein the formed input data is formed for providing to the transmitter to form output data in a transmittal data format to transmit to a receiver side during a telephone call so at least portions of a data packet in the output data or of a data packet derived therefrom at the receiver side is derivable to form a second test signal during the telephone call such that the derived second test signal is analysable at the receiver side via application of a predetermined analysis criterion in order to obtain at least one value for a quality indicator at the receiver side during the telephone call and, in response to the receiver side determining that the at least one value for the quality indicator is not within a pre-defined acceptable threshold during the telephone call, at least one action during the telephone call is performable by the receiver side to (i) adjust how the voice data is output at the receiver side based on the at least one value for the quality indicator and/or (ii) instruct the apparatus to adjust the transmitting of the input data in the transmittal data format based on the at least one value for the quality indicator;

the apparatus also configured to respond to at least one instruction received from the receiver side to adjust transmitting of the input data in the transmittal data format that is based on the at least one value for the quality indicator during the telephone call.

12. The apparatus of claim 11, further including a clock, the apparatus configured to include time stamps in the input data or in data obtained from the input data.

13. An apparatus for performing a telephone call including:

a receiver and a loudspeaker coupled to the receiver, wherein the apparatus is configured to separate, from a frequency spectrum of data received by the receiver during a telephone call from a transmitter side, amplitude portions pertaining to test data included in the received data and to provide the data from which the test data have been separated to the loudspeaker, and to provide the test data to analyse the test data according to a predetermined criterion to obtain a value for a quality indicator and, in response to determining that the at least one value for the quality indicator is not within a pre-defined acceptable threshold during the telephone call, perform at least one action during the telephone to (i) adjust how voice data is output at the loudspeaker based on the at least one value for the quality indicator and/or (ii) instruct the transmitter side to adjust transmission of the data being received at the receiver based on the at least one value for the quality indicator.

14. The apparatus of claim 13, wherein:

a) apparatus includes at least one filter; and/or b) the apparatus is configured to provide a frequency transformation of the test data, compare at least one amplitude value in the frequency transformation to a given amplitude value, the at least one given amplitude value being storeable in a storage unit of the apparatus or a storage unit coupled thereto.

15. The apparatus of claim 14, wherein at least one given amplitude value is derived from other data transmitted to the apparatus.

16. The apparatus of claim 13, comprising:

a microphone for acquiring voice data; and a transmitter coupled to the microphone, the apparatus also configured to combine the voice data with test data to form input data to provide the input data to the transmitter, said test data being predetermined or defined in dependence of the voice data.

17. The apparatus of claim 16, further including a clock for generating time stamps, the apparatus configured to include the time stamps in the input data or in data obtained from the input data.

18. A system for performing a telephone call comprising:

at least one first apparatus, the first apparatus being an apparatus of claim 11; and at least one second apparatus, the second apparatus including:

a receiver and a loudspeaker coupled to the receiver, wherein the second apparatus is configured to separate, from a frequency spectrum of data received by the receiver during a telephone call, amplitude portions pertaining to test data included in the received data and to provide the data from which the test data have been separated to the loudspeaker, and to provide the test data to analyse the test data according to a predetermined criterion to obtain a value for a quality indicator and, in response to determining that the at least one value for the quality indicator is not within a pre-defined acceptable threshold during the telephone call, perform at least one action during the telephone to (i) adjust how voice data is output at the loudspeaker based on the at least one value for the quality indicator and/or (ii) instruct the first apparatus to adjust transmission of the data being received at the receiver based on the at least one value for the quality indicator; and the first apparatus configured to respond to instruction from the second apparatus to improve quality of the data being transmitted to the receiver during the telephone call.

* * * * *